July 31, 1956  H. W. HEIN  2,757,023
ADJUSTABLE BRACKET FOR PIPE-LINE ARRANGEMENT
Filed Aug. 12, 1955
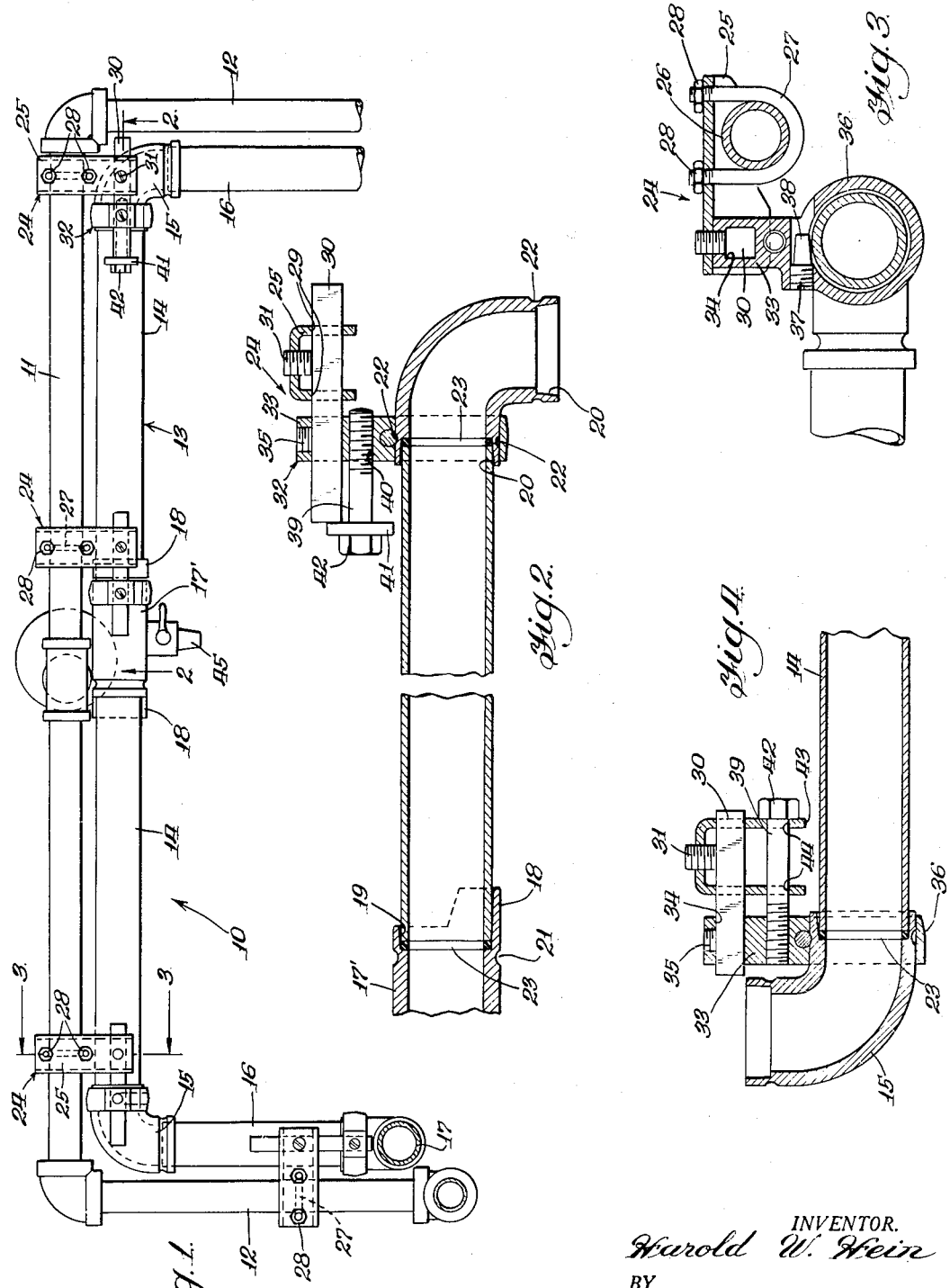
INVENTOR.
Harold W. Hein
BY
Paul O. Pipper
Atty.

United States Patent Office 2,757,023
Patented July 31, 1956

2,757,023

ADJUSTABLE BRACKET FOR PIPE-LINE ARRANGEMENT

Harold W. Hein, Richmond, Ind., assignor to International Harvester Company, a corporation of New Jersey Application August 12, 1955, Serial No. 527,933

8 Claims. (Cl. 285—31)

This invention relates to a pipe-line arrangement and more particularly to an adjustable bracket device for pipe lines. More specifically the invention relates to an adjustable bracket for permitting the quick assembly and disassembly of a separable milk line particularly useful in connection with milker stalls.

It is a prime object of this invention to provide an improved milk pipe line for milker stalls, the said assembly including separable tubular sections which can quickly be disassembled for washing purposes.

A still further object is to provide an improved bracket assembly for a pipe line milking installation, the said bracket assembly being adapted to connect a plurality of separable tubular sections and having improved adjusting means whereby the tubular sections may have their ends placed in adjacent compression against a gasket to suitably seal the sections in assembly, the bracket being quickly adjustable for disconnecting the separate sections from their assembled relation.

These and further objects will become more readily apparent from a reading of the specification when examined in connection with the accompanying sheet of drawing.

In the drawing:

Figure 1 is a plan view of a pipe-line arrangement suitable for milker establishment installation;

Figure 2 is a cross sectional view taken substantially along the line 2—2 of Figure 1;

Figure 3 is a cross sectional view taken substantially along the line 3—3 of Figure 1; and Figure 4 is a cross sectional view similar to Figure 3, showing a modified bracket assembly for a pipe-line milking installation.

Referring now particularly to Figures 1 and 2, a pipe-line arrangement is generally designated by the reference character 10. The pipe-line arrangement 10 is particularly adapted for installation in milker establishments wherein the milking of the animal is accomplished by one or more milking machines actuated by vacuum from a central source. The reference character 11 designates a vacuum conduit having connecting members 12 disposed at right angles with respect thereto. The vacuum conduit 11 is generally connected to a central source of vacuum (not shown). A milk conduit or milk lines is generally designated by the reference character 13 and comprises a plurality of separable tubular sections 14. At the extreme left and right hand ends of the conduit 13 there are provided elbows 15 which in turn are connected to tubular sections 16. It is, of course, apparent that any number of the tubular connections 14, 16 and elbows 15 may be employed in extending the milk line from the milking stalls to a suitable receiving reservoir (not shown) which may be remotely positioned with respect to the animals which are milked. As best indicated in Figure 1, a tubular stub section is designated at 17'. The stub section 17' is provided at its opposite ends with arcuate shaped extensions or lips 18, the said section 17' also being provided with oppositely disposed recesses 19 which receive adjacent ends of a tubular section 14 as indicated. The elbows 15 are also provided with suitable recesses 20 for receiving adjacent ends of the tubular sections.

The stub section 17' is also provided with external grooves 21 extending circumferentially around the outer periphery of the stub section. Likewise, the elbows 15 are provided with similar grooves 22. In assembly a resilient gasket 23 is positioned within the recesses 19 and 20 for suitable compressive engagement with the adjacent ends of the tubular sections 14.

The milk line 13 is provided with a plurality of spaced bracket devices generally designated at 24, these devices being suitably connected to the vacuum conduit 11 to radially space the milk line 13 with respect to the said conduit. Each bracket device comprises a channel-shaped bracket 25 having suitable arcuate cut-out portions 26 which fit against the contour of the vacuum conduit 11. A U-bolt 27 suitably connects each bracket 25 to the vacuum conduit 11 by means of a plurality of nuts 28. The bracket 25 is provided with aligned rectangular slots 29 in which a bar 30 is slidably positioned. The bar 30 may be moved to a plurality of positions on the bracket 25 by means of a setscrew 31 which, when suitably tightened, rigidly secures the bar 30 to the bracket 25. A hanger bracket 32 is slidably positioned on the bar 30, the said hanger bracket comprising an upper section 33 having a slot 34 conforming to the shape of the bar 30. A setscrew 35 threaded into the upper section 33 adjustably secures the hanger bracket 32 with respect to the bar 30. The hanger bracket is also provided with a collar 36 adapted to encircle and provide a support for an adjacent end of one of the tubular sections 14 when disposed in registry with one of the elbows 15. As best indicated in Figure 3, a setscrew 37 is adjustably supported on the collar 36, the setscrew 37 having a frustoconical end portion 38 which is adapted to suitably engage a groove 22 of the elbow 15 as indicated. Depending on the position at which one of the hanger brackets 32 is positioned, it can also be seen that the setscrew 37 may also be engaged with one of the grooves 21 of the tubular stub sections 17, as shown in Fig. 1. Tightening of the screw 37 thus serves to suitably lock the elbows 15 to the hanger brackets 32 or to the stub section 17.

As indicated in Figure 2 and at the right hand end of the conduits 11 and 13 an adjusting bolt 39 is threaded into the collar 32. The adjusting bolt 39 by virtue of its threaded engagement as indicated at 40 may be longitudinally adjusted with respect to the tubular sections. The adjusting bolt 39 is also provided with a washer 41 which is engaged by a head 42, the said washer bearing against the end of the bar 30 as indicated.

In the modification shown in Figure 4 the parts are identical with the exception of the channel-shaped bracket which is designated at 43. In this connection the bracket 43 is quite similar to the bracket 25, the former, however, having considerably longer leg portions which are provided with suitable openings 44 to support the adjusting bolt 39.

In assembly, as best shown in Figure 1, the bracket device 24 at the extreme left hand end of the arrangement 10 is placed in position. The stub section 17' is also placed in position on a bracket device 24 positioned substantially centrally as indicated. The left hand elbow 15 is connected to one of the hanger brackets 23 which in turn is placed on the bar 30 of the left hand bracket device 24. The sub section 17' is positioned with respect to a hanger bracket, centrally disposed, which is then also slidably placed in connection with the bar of the centrally disposed bracket 24. It is noted that the stub section 17' also includes a milk cock 45 which may provide for the entry of milk to the conduit. A gasket 23 is now placed in the recess 20 of the left hand elbow 15 and another gasket is inserted in the left hand side of the stub section 17'. The tubular sections 14 may be of plastic or glass and the left hand tubular section 14 can now be positioned in the manner indicated, the said positioning being relatively simple in view of the lip portion 18 which suitably cradles the adjacent end of the tubular section 14. The stub section 17', being loosely positioned with respect to its adjacent bar 30, can now be moved to the left so that the gaskets are snugly engaged. The elbow 15 in the right hand corner is now placed in position with respect to the bracket device 24 positioned at that end of the arrangement. A gasket is now inserted in the recess of the right hand elbow and into the free recess of the stub section 17'. Another length of conduit or tubular section 14 is now placed into position and the right hand hanger bracket 32 is moved to the left thereby drawing up any slack and properly positioning all of the elements in relatively snug relation. The setscrews 37 are all suitably tightened so that the brackets 32 are relatively rigid with respect to the parts which they engage. At this point the setscrews 35 are positioned loosely with respect to the bars 30 so that the brackets 32 may be adjusted relative to said bars. The adjusting bolt 39 is tightened relative to the right hand bracket 32 and this causes the bracket 32 to exert an endwise pressure, to the left, on the assemblage of parts whereupon the tubular sections are positioned in relatively tight relation with respect to the gaskets 23. After this type adjustment has been effected the setscrews 35 are tightened and the assembly is in firm sealing relation.

It can be seen that the sections 16 are similarly adjusted and positioned and, of course, numerous of the bracket assemblies can be utilized to position an infinite number of tubular sections in this relation. By simply loosening the setscrews 35 and by loosening the adjusting bolt 39 the parts can be moved apart so that the tubular sections can easily be removed for washing purposes.

The modification shown in Figure 4 functions in the same manner with the exception that in this case the adjusting bolt 39 is supported on the channel 43 but adjusting movement of the bracket 33 is effected in the same manner.

Thus it is apparent that an improved bracket assembly for exerting an endwise thrust against a plurality of separable tubular sections has been provided, the said bracket assembly permitting quick assembly and disassembly of the parts whenever necessary. By virtue of the quickly adjustable feature of the brackets, any different types or lengths of separable tubular sections may be employed and in each connection a secure water-tight assembly is obtained by virtue of the adjusting means afforded. It is believed that the objects of the invention have thus been fully achieved and that modifications may be made which do not depart from the spirit of the invention or the scope thereof as defined in the appended claims.

What is claimed is:

1. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, said bracket having an opening extending substantially parallel to said conduits, a bar adjustably positioned in said opening, first lock means on said bracket engaging said bar for locking the same in a number of positions, a hanger member, said hanger member having a portion with an opening engaging said bar in relative sliding relation, a second locking means on said hanger portion adapted to lock said hanger in a number of positions on said bar, a collar connected to said hanger portion, said collar having an opening adapted to receive one of the separable sections for supporting the same, adjustable fastening means on said collar for engaging one of said sections to fasten the same to said collar, and a threaded member rotatably connected to said bar and to said hanger, said threaded member being rotatable for reciprocating said hanger and a section connected thereto relative to said bar.

2. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, said bracket having an opening extending substantially parallel to said conduits, a bar adjustably positioned in said opening, first lock means on said bracket engaging said bar for locking the same in a number of positions, a hanger member, said hanger member having a portion with an opening engaging said bar in relative sliding relation, a second locking means on said hanger portion adapted to lock said hanger in a number of positions on said bar, a collar connected to said hanger portion, said collar having an opening adapted to receive one of the separable sections for supporting the same, adjustable fastening means on said collar for engaging one of said sections to fasten the same to said collar, and adjustable means connected to said bar and to said hanger, said adjustable means being movable for reciprocating said hanger and a section connected thereto relative to said bar.

3. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, a bar adjustably positioned on said bracket, first lock means on said bracket engaging said bar for locking the same in a number of positions, a hanger member, said hanger member having a portion with an opening engaging said bar in relative sliding relation, a second locking means on said hanger portion adapted to lock said hanger in a number of positions on said bar, a collar connected to said hanger portion, said collar having an opening adapted to receive one of the separable sections for supporting the same, adjustable fastening means on said collar for engaging one of said sections to fasten the same to said collar, and adjustable means connected to said bar and to said hanger, said adjustable means being movable for reciprocating said hanger and a section connected thereto relative to said bar.

4. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, a bar adjustably positioned on said bracket, first lock means on said bracket engaging said bar for locking the same in a number of positions, a hanger member, said hanger member having a portion engaging said bar in relative sliding relation, a second locking means on said hanger portion adapted to lock said hanger in a number of positions on said bar, a collar connected to said hanger portion, said collar having an opening adapted to receive one of the separable sections for supporting the same, adjustable fastening means on said collar for engaging one of said sections to fasten the same to said collar, said adjustable means being movable for reciprocating said hanger and a section connected thereto relative to said bar.

5. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, a bar supported on said bracket, a hanger member, said hanger member having a portion engaging said bar in relative sliding relation, a locking means on said hanger portion adapted to lock said hanger in a number of positions on said bar, a collar connected to said hanger portion, said collar having an opening adapted to receive one of the separable sections for supporting the same, adjustable fastening means on said collar for engaging one of said sections to fasten the same to said collar, and adjustable means connected to said bar and to said hanger, said adjustable means being movable for reciprocating said hanger and a section connected thereto relative to said bar.

6. For a pipe-line assembly comprising a first conduit and a second conduit extending substantially parallel to said first conduit, and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit and to project radially outwardly with respect thereto, a bar supported on said bracket, a hanger member, said hanger member having a portion engaging said bar in relative sliding relation, a collar connected to said hanger portion, said collar having an opening adapted to receive one of the separable sections for supporting the same, and adjustable means connected to said bar and to said hanger, said adjustable means being movable for reciprocating said hanger and a section connected thereto relative to said bar.

7. For a pipe-line assembly comprising a first conduit and a second conduit extending substantially parallel to said first conduit and spaced radially therefrom, said second conduit comprising a plurality of separable tubular sections positioned with ends in adjacent relation; a device for exerting a longitudinally directed pressure against said sections to firmly join the adjacent ends of the section in assembly; comprising, a bracket adapted to be connected to the first conduit, a bar adjustably connected to said bracket and extending parallel to said second conduit, a hanger member slidably supported on said bar, means locking said hanger member to said bar in a plurality of portions, a collar on said hanger member having an opening adapted to receive a separable section in supporting relation, an adjustable lock member on said collar movable to engage the outer surface of a tubular section for locking the same to said collar, and means connected to said bracket for engaging and moving said hanger longitudinally relative to said first conduit.

8. For a pipe-line assembly comprising a first conduit and a second conduit extending substantially parallel to said first conduit and spaced radially therefrom, said second conduit comprising a plurality of separable tubular sections positioned with ends in adjacent relation; a device for exerting a longitudinally directed pressure against said sections to firmly join the adjacent ends of the sections in assembly; comprising, a bracket adapted to be connected to the first conduit, a bar adjustably connected to said bracket and extending parallel to said second conduit, a hanger member slidably supported on said bar, a collar on said hanger member having an opening adapted to receive a separable section in supporting relation, an adjustable lock member on said collar movable to engage the outer surface of a tubular section for locking the same to said collar, and means connected to said bracket for engaging and moving said hanger longitudinally relative to said first conduit.

No references cited.